June 19, 1951 W. J. PARDUCCI 2,557,559
CRANKSHAFT CONSTRUCTION
Filed March 28, 1946
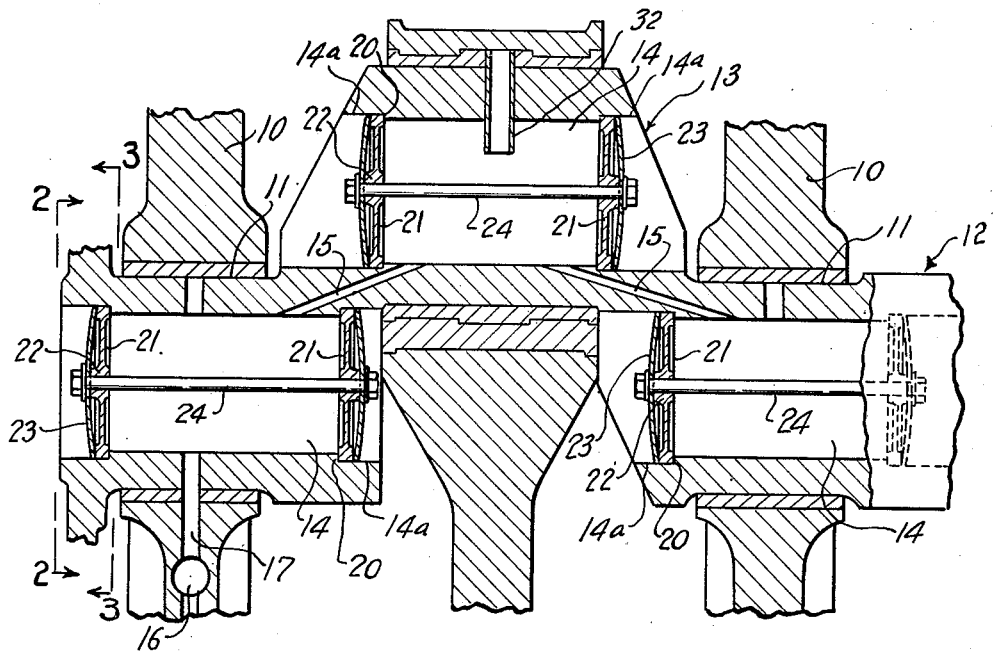
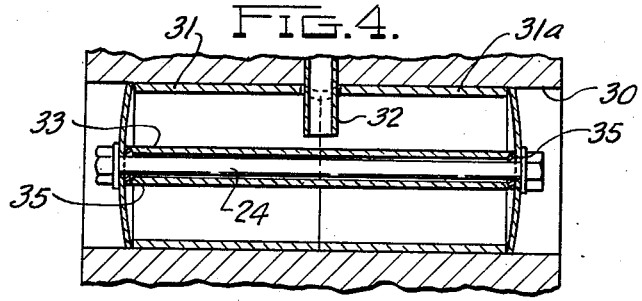
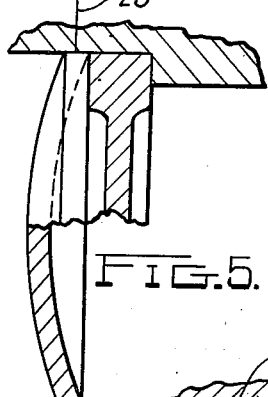
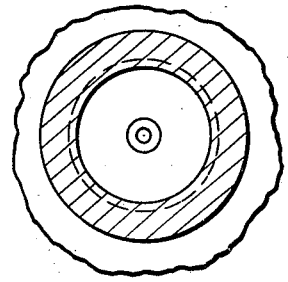
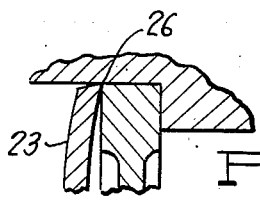
INVENTOR.
William J. Parducci
BY
ATTORNEYS Patented June 19, 1951

2,557,559

UNITED STATES PATENT OFFICE 2,557,559

CRANKSHAFT CONSTRUCTION

William J. Parducci, Detroit, Mich., assignor to Continental Aviation & Engineering Corporation, Detroit, Mich., a corporation of Virginia Application March 28, 1946, Serial No. 657,749

4 Claims. (Cl. 184—6)

This invention relates to crankshafts, and more particularly to means for sealing open end bores of such crankshafts when used as oil chambers or passages, and the principles of the present invention, though of practical use for closing the open ends of any cylinders, are obviously particularly applicable to crankshafts for aircraft engines.

In aircraft engines it is customary to bore out the shaft to reduce weight and such bored out passages are generally employed as lubricant chambers or passages, and thus the open ends of said bores are plugged or otherwise closed to positively seal against leakage of the lubricating oil customarily circulated through said chambers or passages under pressure. Usually, such plugs or sealing means are more or less permanently secured in place, or are so tightly fitted that same are not readily removed, and when so removed the said bore is so badly scored or mutilated that the closure means cannot be assembled again in such a way as to insure a tight oil seal.

An object of the present invention is to construct an improved oil sealing means for closing open end cylinders or bores, and particularly the open end bores of an internal combustion engine crankshaft, by providing an expanding plug which may be accurately positioned and more tightly wedged against the surface of the bore without particularly defacing the surface of the bore, but serving to provide a positive oil seal.

Another object of the present invention is to construct a rugged oil seal structure for open end cylinders or bores by providing an expanding flexible plug whose peripheral edge is yieldingly pressed into oil sealing contact with the surface of the cylinder or bore. More particularly, I employ a plug comprising a dished spring disc, and means for controlling the expansion to effect a maximum of force tightly urging the periphery of said plug into oil sealing contact with the cylinder or bore surface.

For a more detailed understanding of the invention, reference may be had to the accompanying drawing illustrating preferred embodiments of my invention, in which like characters refer to like parts throughout the several views, and in which Fig. 1 is a fragmentary longitudinal sectional view of a portion of an aircraft engine crankshaft, illustrating one embodiment of the invention.

Fig. 2 is a transverse detailed sectional view taken on the line 2—2 of Fig. 1.

Fig. 3 is a transverse detailed sectional view taken on the line 3—3 of Fig. 1.

Fig. 4 is a fragmentary sectional view of a modified construction.

Fig. 5 is a detail view, partly in section, of one of the expanding dish-like spring discs employed as plugs for closing the open end bores of said crankshaft and Fig. 6 is an enlarged fragmentary detail sectional view showing the relation of the spring disc and the abutment.

While the present invention is embodied in an engine crankshaft, the principles of my invention are applicable generally for open end cylinders or bores, other than those of engine crankshafts and the like. In the present embodiment, the engine comprises a crankcase structure 10 having the conventional or standard bearings 11 for supporting a crankshaft 12. This crankshaft carries a crank portion 13, and following the customary aircraft engine practice is internally bored to provide oil chambers or passages 14, preferably inter-connected by suitably drilled passages 15. The lubricating oil under pressure is introduced to said internal crankshaft bores from the main oil pressure conduit 16 and by passage 17 connecting said conduit with the internal bore of the shaft through one of the bearings 11.

The bores 14 of the crankshaft are sometimes bored straight through as in Fig. 4, and again may be formed with enlarged counterbored portions at each end as illustrated in Fig. 1. These enlarged counterbored portions 14a provide shoulders 20, which are employed to provide a stop or abutment against which is seated the abutment members 21 constructed preferably of heavy rigid sections which are not flexed to any appreciable degree. The central hub portion 22 of these abutment members 21 are so constructed and arranged to serve as a stop or abutment which will limit the flattening of said dish-like spring discs 23. These discs 23 are of such a diameter that same are readily fitted into the counterbored portion 14a, and the peripheral edge of the discs is preferably formed coaxial with the bore (see Fig. 5). The center bolts 24 tie the assemblies together, and on tightening down these nut and bolt assemblies, the discs 23 are gradually flattened until the center portion thereof abuts against the abutment member 21. In flattening said discs, same are expanded and exert a force radially outwardly against the surface of the bore in the direction of the arrow 25 (Fig. 5), the inside peripheral edge 26 of said discs having a tendency to bite into the bore surface. However, the discs are preferably made of a material, such as aluminum, which is relatively softer than the material of which the crankshaft is constructed and consequently instead of the discs biting into the surface of the bore, the edge 26 of the discs are peened over. The discs however exert a relatively large radial force against the walls of the bore, and consequently provide a tight oil seal.

In Fig. 4 I have illustrated a modified construction utilizing the principles of my invention in a straight bore. The bore 30 is lined with the sleeves 31 and 31a, the oil tube 32 serving to locate these sleeves centrally of the bore. A sleeve 33 is assembled around the bolt 24, and has a length slightly in excess of the sleeves 31—31a. The discs 23 are fitted into the bore 30 and their peripheral edges abut the ends of the sleeves 31 and 31a. On tightening the bolt and nut assembly 24, both discs are flattened until the central portion of said discs abut the ends of the sleeve 33 just prior to being entirely flattened. The discs in Fig. 4 are thus expanded and flattened to exert a radial force against the surface of the bore 30, the same as discs 23 are flattened to exert a radial force similarly against the surface of bores 14a (Figs. 1, 5 and 6).

In the construction of Fig. 4, I preferably employ a gasket 35 at the end of the tube or sleeve 23, which is internally chamfered to receive the gasket and thus seal the oil against leakage from the chamber or bore 30 around the bolt and out through the hole in the disc.

The constructions described herein are very quickly assembled throughout. They are rather readily removed for servicing the engine, and most generally said discs can be used over and over again.

Although I have illustrated but one form of the invention, and have described in detail but a single application thereof, it will be apparent to those skilled in the art to which my invention pertains, that various modifications and changes may be made therein without departing from the spirit of my invention or from the scope of the appended claims.

I claim:

1. A crankshaft comprising a shaft portion provided with a longitudinal bore, abutment members seated in said bore, generally dished shaped spring discs fitted into said bore, and a bolt extending longitudinally through said bore and engaging said discs to secure said assembly and on being tightened, causing said discs to be relatively flattened and thereby radially expanded against the surface of said bore, said abutment members provided with a projection serving as a stop and adapted to be engaged by said disc prior to being fully flattened, whereby to limit the flattening movement of said discs.

2. A crankshaft comprising a shaft portion provided with a longitudinal bore, abutment members seated in said bore, generally dished shaped spring discs fitted into said bore, and a bolt extending longitudinally through said bore and engaging said discs to secure said assembly and on being tightened, causing said discs to be relatively flattened and thereby radially expanded against the surface of said bore, said abutment members provided with a stop engaged by the central portion of said discs to limit the flattening movement of same.

3. A crankshaft comprising a shaft portion provided with a longitudinal bore, said bore having an enlarged counterbored portion at both ends, members seated in said enlarged bores, generally dished shaped spring discs fitted into said enlarged bore, and a bolt extending longitudinally through said bore and engaging said discs to secure said assembly and on being tightened, causing said discs to be relatively flattened and thereby radially and yieldingly expanded against the surface of said enlarged bore, each of said abutment members provided with a projecting boss serving as a stop and engaged by said disc prior to being fully flattened, whereby to limit the flattening movement of said discs.

4. A crankshaft comprising a shaft portion provided with a longitudinal bore, the ends of said bore having an enlarged counterbored portion, abutment members seated in said enlarged bores, generally dished shaped spring discs, fitted into said enlarged bore, and a bolt extending longitudinally through said bore and engaging said discs to secure said assembly and on being tightened, causing said discs to be relatively flattened and thereby radially and yieldingly expanded against the surface of said enlarged bore, said enlarged counterbored portions forming shoulders against which said abutment members are seated, said abutment members comprising an outwardly projecting center portion operable for abutment with the central portion of said spring disc to limit the flattening movement of said spring discs.

WILLIAM J. PARDUCCI.

REFERENCES CITED

The following references are of record in the file of this patent:

UNITED STATES PATENTS

| Number | Name | Date |
|---|---|---|
| 1,874,444 | Carvelli | Aug. 30, 1932 |
| 1,978,714 | Lentell | Oct. 30, 1934 |
| 2,048,002 | Frelin | July 21, 1936 |

FOREIGN PATENTS

| Number | Country | Date |
|---|---|---|
| 6,923 | Germany | Aug. 23, 1879 |
| 219,890 | Great Britain | Aug. 7, 1924 |